Feb. 2, 1954  H. W. HAPMAN  2,667,962
FLIGHT CONVEYER WITH FLANGED CLAMPING DISKS
Original Filed Dec. 13, 1944
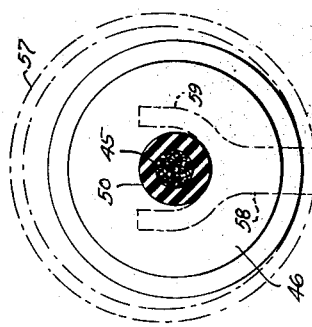
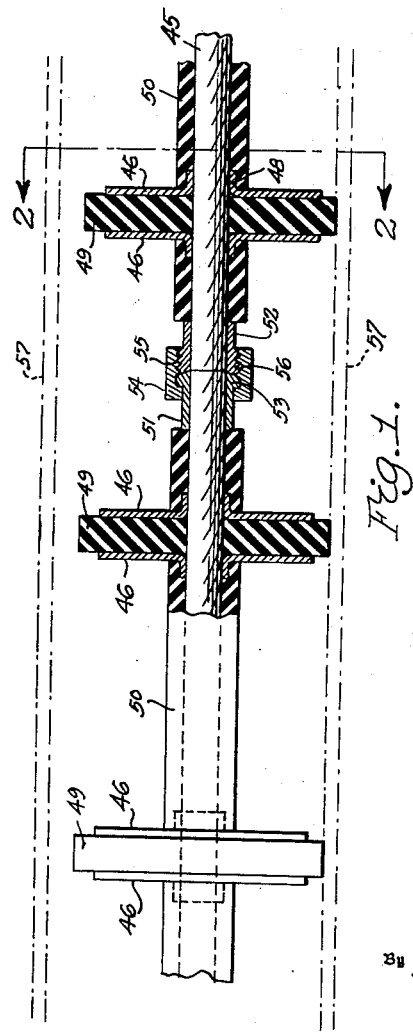
Inventor
By Henry W. Hapman
Barthel & Bugbee
Attorneys Patented Feb. 2, 1954

2,667,962

UNITED STATES PATENT OFFICE 2,667,962

FLIGHT CONVEYER WITH FLANGED CLAMPING DISKS

Henry W. Hapman, Hickory Corners, Mich., assignor of forty per cent to Hannah Jane Hapman, Hickory Corners, Mich.

Application October 28, 1948, Serial No. 57,048, which is a division of application Serial No. 567,961, December 13, 1944. Divided and this application September 10, 1951, Serial No. 245,921

4 Claims. (Cl. 198—176)

This invention relates to improvements in conveyor structures and, in particular, to a flexible conveyor element with conveyor flights thereon.

One object of this invention is to provide a flight conveyor having a flexible conveyor element with spaced flights thereon which are spaced by resilient tubular sleeve members extending between adjacent flights to protect the flexible conveyor element and increase the tensile strength thereof.

Another object is to provide a flight conveyor having a flexible conveyor element with spaced flights thereon, preferably of rubber-like material, and having a clamping plate on one or both sides thereof, with the flight projecting a slight distance beyond the edge thereof so as to lend sufficient rigidity to the flight and yet prevent excessive wear on the conveyor conduit in which the conveyor is employed.

Another object is to provide a flight conveyor of the above-mentioned type in which the clamping plates have flanges extending along the flexible conveyor element.

Another object is to provide a flight conveyor of the above-mentioned type in which the resilient tubular sleeve members are adhesively secured to the flexible conveyor element as well as to the conveyor flights to assist in increasing the tensile strength of the flexible conveyor element and facilitate the handling of relatively heavy loads.

This is a division of my co-pending application Serial No. 57,048, filed October 28, 1948, for Flight Conveyor Structure, which was issued on February 19, 1952, as U. S. Patent No. 2,586,538, and which was itself co-pending with and a division of application Serial No. 567,961, filed December 13, 1944, for Conveyor Element Structure, the latter having been issued on June 5, 1951, as U. S. Patent No. 2,555,338.

Other objects and advantages of the invention will become apparent during the course of the following description of the accompanying drawings, wherein:

Figure 1 is a side elevation of a flight conveyor according to one form of the invention, partly in longitudinal section; and Figure 2 is a cross-section along the line 2—2 in Figure 1.

Referring to the drawings in detail, Figures 1 and 2 show one form of flight conveyor structure according to the invention wherein there is provided a single flexible conveyor-propelling element in the form of a wire cable 45 adapted to have assembled thereon a series of conveyor flight clamping plates 46 having centrally-disposed annular flanges 48 surrounding suitable apertures in said conveyor flight plates 46 so as to be frictionally retained on the flexible wire cable 45. Also disposed on the flexible wire cable 45 is a series of natural or synthetic rubber disc flight elements 49 which are sandwiched between the conveyor flight plates 46 so that the peripheral portion thereof projects a slight distance beyond the peripheral edge of the conveyor flight plate 46.

Tubular rubber spacing sleeves 50 are assembled on the wire cable 45 and disposed between adjacent conveyor flight plates 45, as shown in Figure 1, so that the ends of said tubular rubber sleeves or spacing elements 50 will overlie the annular flanges 48 of the conveyor flight plates 46 so that the tubular rubber sleeves may be adhesively secured to the flanges 48 and conveyor flight plates 46 by a rubber cement composition, such as the cement described in the United States Patents Nos. 1,605,180, 1,617,588 and 1,744,880. The rubber spacing sleeves 50 are adhesively secured to the flexible wire cable 45 as well as the natural or synthetic rubber flight elements 49.

When the flight elements and tubular spacing sleeves 50 have thus been assembled on the wire cable 45, the ends thereof may be provided with tubular coupling members 51 and 52 so that the ends of said wire cables 45 may be welded or otherwise secured in place therein as shown clearly in Figure 1. An annular flange 53 is formed on the tubular coupling member 51 for retaining a coupling sleeve 54 thereon having internal screw threads 55 for receiving external screw threads 56 formed on the enlarged head portion of the tubular coupling member 52. By simply threading the coupling sleeve 54 on the threads 56 of the tubular coupling sleeve 52, the ends of the cable 45 may be securely fastened together so that the endless flexible conveyor element may be mounted in a conveyor conduit or passageway, as at 57 and propelled therein by means of a suitable drive sprocket 58. As shown in Figure 2, the drive sprocket 58 is provided with a series of circumferentially-spaced forked portions 59 for receiving the wire cable 45 and tubular spacing sleeves 50 so that the forked portion 59 may drivingly engage one of the conveyor flight plates 46.

What I claim is:

1. A flight conveyor comprising a flexible conveyor element, a series of conveyor flight supporting plates spacedly mounted on said conveyor element, plate-shaped flights secured to said supporting plates, and sleeve members of rubber-like material extending between said flight supporting plates, said flight supporting plates having axially extending portions disposed adjacent said flexible conveyor element, the ends of said sleeve members extending over said axially-extending plate portions.

2. A flight conveyor comprising a flexible conveyor element, a series of conveyor flight supporting plates spacedly mounted on said conveyor element, flexible flights of rubber-like material secured to said supporting plates, and sleeve members of rubber-like material extending between said flight supporting plates, said flight supporting plates having axially extending portions disposed adjacent said flexible conveyor element, the ends of said sleeve members extending over said axially-extending plate portions.

3. A flight conveyor comprising a flexible conveyor element, a series of conveyor flight supporting plates spacedly mounted on said conveyor element, and flexible flights of rubber-like material secured to said supporting plates, said flight supporting plates having axially-extending annular flanges encircling the flexible conveyor element, the ends of said sleeve members extending over said flanges.

4. A flight conveyor comprising a flexible conveyor element, a series of pairs of conveyor flight supporting plates spacedly mounted on said conveyor element, flexible flights of rubber-like material secured between adjacent pairs of said supporting plates, and sleeve members of rubber-like material extending between said flight supporting plates, said flight supporting plates having axially-extending portions disposed adjacent said flexible conveyor element, the ends of said sleeve members extending over said axially-extending plate portions.

HENRY W. HAPMAN.

References Cited in the file of this patent

UNITED STATES PATENTS

| Number | Name | Date |
|---|---|---|
| 2,555,338 | Hapman | June 5, 1951 |